United States Patent [19]

Wilson

[11] 4,345,208
[45] Aug. 17, 1982

[54] ANTI-FALSING AND ZERO NULLING SEARCH HEAD FOR A METAL DETECTOR

[76] Inventor: Paul S. Wilson, 4415 Brookton Dr., South Bend, Ind. 46614

[21] Appl. No.: 146,383

[22] Filed: May 5, 1980

[51] Int. Cl.³ .............................................. G01V 3/11
[52] U.S. Cl. .................................................... 324/329
[58] Field of Search ................................ 324/326–329, 324/334, 338–341, 343, 345, 233, 239–241

[56] References Cited

U.S. PATENT DOCUMENTS

| 269,439 | 12/1882 | McEvoy | 324/334 X |
| 1,126,027 | 1/1915 | Jüllig | 324/326 X |
| 2,451,596 | 10/1948 | Wheeler | 324/334 X |
| 3,471,773 | 10/1969 | Penland | 324/329 |
| 3,644,823 | 2/1972 | Dowling et al. | 324/340 |
| 3,872,380 | 3/1975 | Gardiner | 324/329 |
| 4,030,026 | 6/1977 | Payne | 324/329 |

FOREIGN PATENT DOCUMENTS 1548158  2/1970  Fed. Rep. of Germany ...... 324/324

Primary Examiner—Gerard R. Strecker
Attorney, Agent, or Firm—Oltsch, Knoblock & Hall

[57] ABSTRACT

A metal detector search head which includes a transmitter wire coil and a receiver wire coil each having first and second coil sections. The first coil sections of the receiver and transmitter coils lie in substantially the same plane with the second coil sections thereof being parallel and displaced relative to the first coil sections with each second coil section lying in a plane generally perpendicularly oriented to the plane of location of the first coil sections of the transmitter and receiver coils.

5 Claims, 3 Drawing Figures

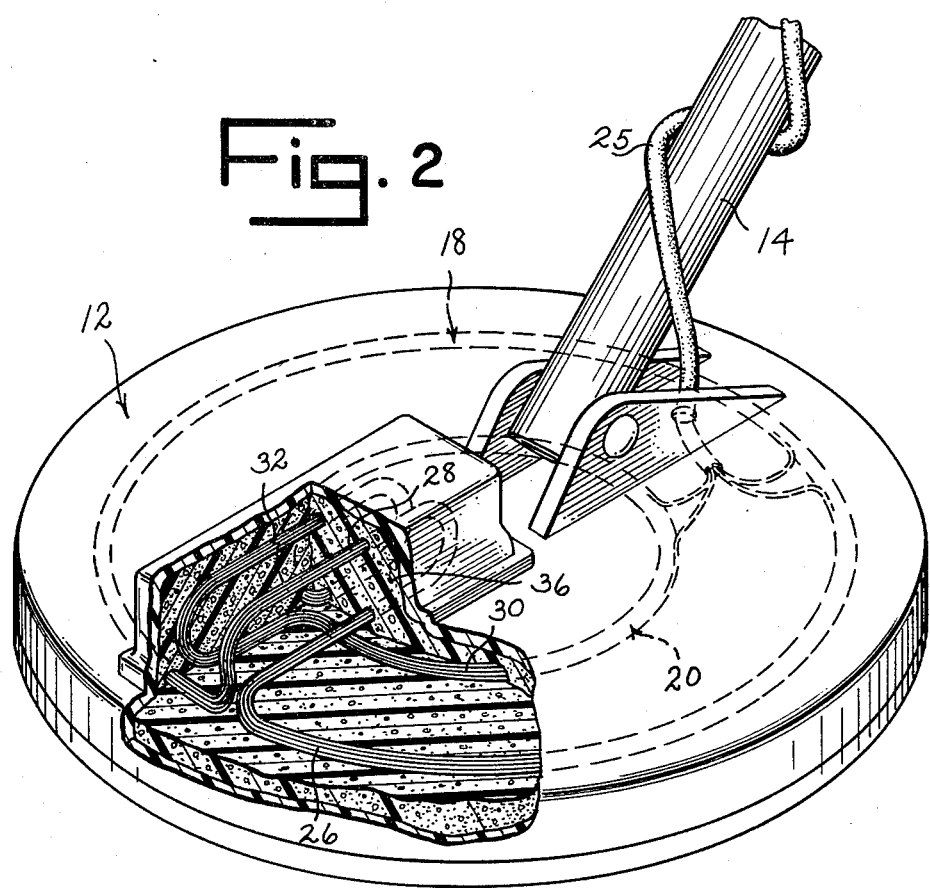
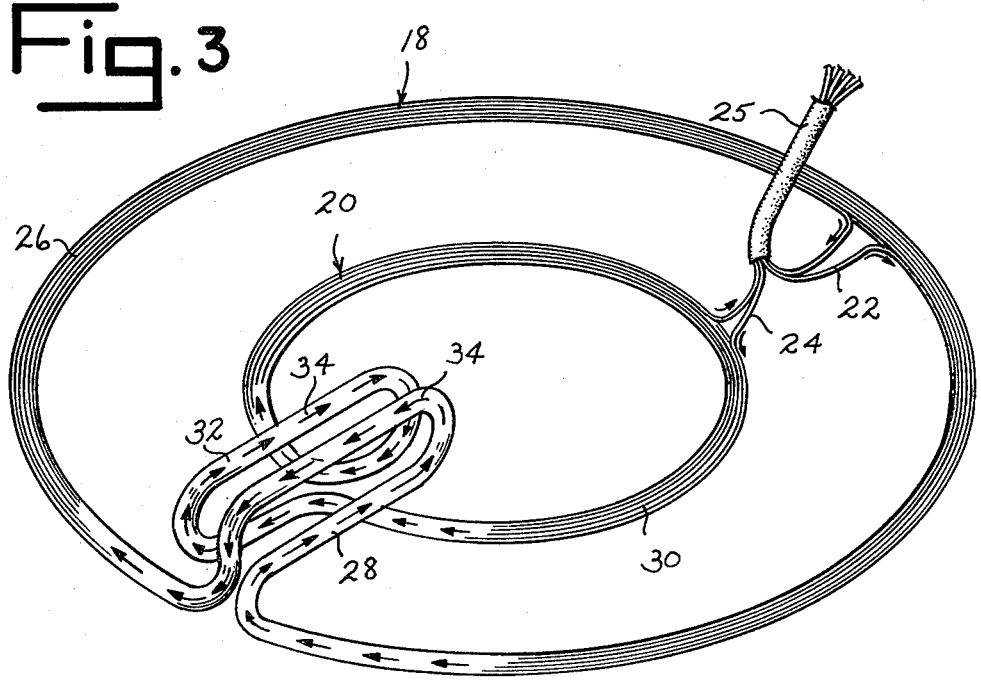

ANTI-FALSING AND ZERO NULLING SEARCH HEAD FOR A METAL DETECTOR

SUMMARY OF THE INVENTION

This invention relates to metal detectors and will have specific application to an improved search head for a hand-held metal detector.

Heretofore, metal detectors have experienced sensitivity and discrimination problems. These cause anti-falsing or back reading effects making location and identification of buried metal objects difficult. Certain undesirable metal objects, such as pull-tabs from cans, provide discrimination difficulties for the user of such metal detectors. In this invention, the receiver and transmitter coils of the detector search head are designed so as to provide positive location and objectn discrimination results. This is accomplished by designing each of the receiver and transmitter coils with first and second coil sections. The first coil sections of the receiver and transmitter coils are positioned so as to lie in substantially the same plane with the receiver first coil section being located within the magnetic produced field of the transmitter first coil section. The second coil sections of the receiver and transmitter coils are positioned in an aligned, parallel relationship with each other and in a generally transverse orientation relative to the plane of the first coil sections. The second coil section of the receiver coil is positioned within the magnetic produced field of the second coil section of the transmitter coil. With an alternating current introduced into the transmitter coil, the field about the transmitter coil which is sensed by the receiver coil will be partly absorbed in the presence of a metal object, causing a reduction in voltage in the first coil section of the receiver coil. This reduction in voltage and accompanying phase shift thereof is compared with the substantially constant voltage in the second coil section of the receiver coil to produce a meaningful reading by the detector user. Back reading or anti-falsing common in prior art metal detector heads is substantially eliminated.

Accordingly, it is an object of this invention to provide the search head for a metal detector which is of high sensitivity and accuracy.

Another object of this invention is to provide a search head for a metal detector which is of reliable and economical construction.

Other objects will become apparent upon a reading of the invention's description.

BRIEF DESCRIPTION OF THE DRAWINGS

A preferred embodiment of this invention has been chosen for purposes of illustration and description wherein:

FIG. 2 is a fragmentary perspective view of the search head with portions thereof removed for purposes of illustration.

FIG. 3 is a perspective view of the receiver and transmitter coils of the search head.

DESCRIPTION OF THE PREFERRED EMBODIMENT

Figure 1:
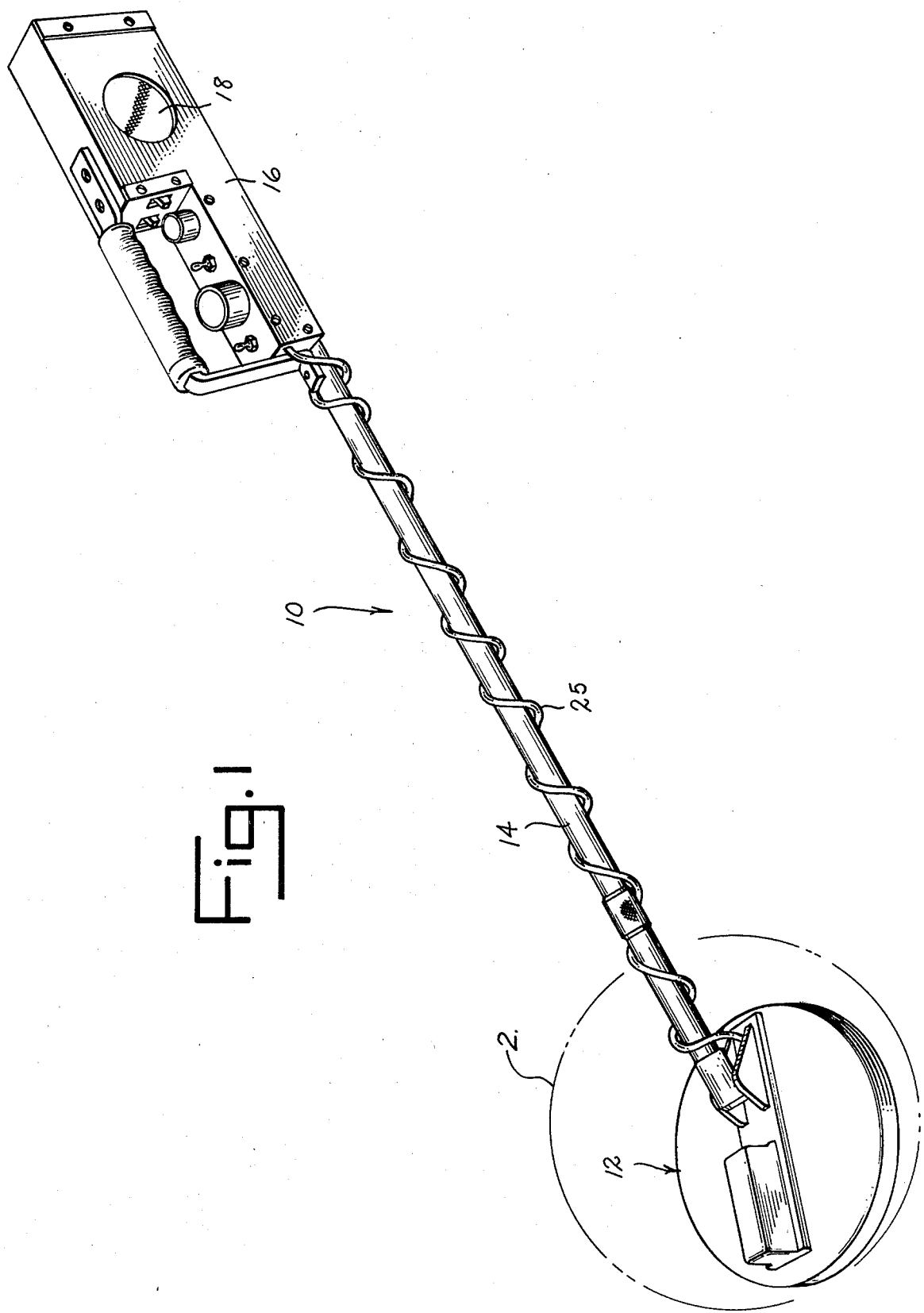
FIG. 1 is a perspective view of a metal detector which includes the search head of this invention.

The preferred embodiment illustrated is not intended to be exhaustive or to limit the invention to the precise form disclosed. It is chosen and described in order to explain the principles of the invention, its application and practical use, to thereby enable others skilled in the art to best utilize the invention.

Metal detector 10, shown in FIG. 1, includes a search head 12 which is pivotally connected to the lower end of a shaft 14. A handle 16 is connected to the opposite end of shaft 14. Handle 16 includes the necessary electrical circuits and controls for operating the detector. Variations in sensitivity and metal discrimination are accomplished by the circuits within handle 16 to produce an audio sound capable of being heard through an external speaker 18 carried within the handle or through head phones. Power for metal detector 10 is provided by means of batteries carried within the handle.

Search head 12 which constitutes the subject matter of this invention is disc-shaped and includes therein a transmitter wire coil 18 and a receiver wire coil 20. Each coil 18 and 20 are preferably formed by a plurality of windings of continuous wire 22, 24 respectively. Wires 22 and 24 extend through an insulated outer cover 25 along shaft 14 and are connected into the electric circuits contained within handle 16. Transmitter coil 18 is formed into a first or primary section 26 and a second or secondary section 28. Receiver coil 20 is also formed into a first or primary section 30 and a second or secondary section 32. The number of individual windings or loops of wires 22 and 24 for each of coils 18 and 20 can vary depending upon the frequency at which the detector is to operate.

First coil sections 26 and 30 lie in substantially the same plane so as to be supported by shaft 14 of detector 10 in a general parallel relationship with the ground during operation of the detector. Coil sections 26 and 30 are preferably each circular in form with receiver section 30 being positioned generally concentric to and within transmitter section 26. Receiver coil section 30 is located within the magnetic field which is produced about transmitter coil section 26 during the introduction of current through wire 22 of transmitter coil 18. Each second coil section 28 and 32 is turned relative to its connected first coil section so that the path of current flow, as indicated by arrows 34, in each second section is differently directed from that in its connected first section. In the illustrated embodiment, each second section 28 and 32 is turned at an approximately 90° angle to its connected first coil section 26 and 30. This causes the magnetic field about each second coil section 28, 32 to be out of phase with the magnetic field created about its connected first coil section 26, 30. Second coil sections 28 and 32 are generally aligned and parallel each other in a location above the plane within which first coil sections 26 and 30 are positioned. While for illustrative purposes each second coil section 28, 32 is shown as one turn, it is to be understood that the number of turns per section may vary with each second section preferably containing an equal number of turns.

During assembly of search head 12, first coil sections 26 and 30 are first fixedly located, then the spacing between second coil sections 28 and 32 is varied as the operative current is introduced into transmitter coil 18 until preferably the same voltage is induced within coil section 32 from the magnetic field of coil section 28 as is induced into coil section 30 from the magnetic field of coil section 26. When this occurs, coil sections 30 and 32 are considered balanced. Second coil sections 28 and 32 are then fixed in position such as with a bonding agent 36 formed or poured about the coils.

In operation of detector 10, an alternating current, preferably in the radio frequency range, is introduced by wire 22 into transmitter coil 18. As search head 12 is brought into the presence of a metallic object, a portion of the magnetic field of first coil section 26 of transmitter coil 18 is absorbed by the object, thereby reducing the induced magnetic field voltage in first coil section 30 of receiver coil 20. Second coil sections 28 and 32 are not substantially affected by the presence of the metallic object so that the induced voltage in second coil section 32 of the receiver coil 20 remains substantially constant. Thus, the presence of a metal object within the sensed field of search head 12 will create a differential in sensed magnetic field and thus induced voltage within first coil section 30 and second coil section 32, as well as a phase shift of this voltage, to permit the circuits within handle 16 of the detector to provide a locale identification and material identification.

Accordingly, it is to be understood that the invention is not to be limited to the details above given, but may be modified within the scope of the appended claims.

What I claim is:

1. In a metal detector including a search head for sensing the presence of a metal object when the head is brought into proximity with said object, said head having mounted therein a transmitter coil adapted to receive a current and receiver coil adapted to sense the magnetic field produced about said transmitter coil by said current, said transmitter coil having first and second coil sections, said receiver coil having first and second coil sections, the first coil section of each transmitter and receiver coil being displaced from the second coil section of each coil, said first coil section of the transmitter coil lying in substantially the same plane as and spaced apart from the first coil section of the receiver coil with the receiver coil first coil section being located within the magnetic field produced about said transmitter first coil section by said current, whereby the presence of said metal object in proximity of said transmitter coil first coil section will cause a reduction in the magnetic field induced voltage in the receiver coil first coil section, the improvement wherein said second coil sections of the transmitter and receiver coils are juxtaposed and in a spaced relationship from the plane of location of said first coil sections of the transmitter and receiver coils with each second coil section overlying the space between said first coil sections of the receiver and transmitter coils and lying in a plane generally perpendicularly oriented to the plane of location of said first coil sections of the transmitter and receiver coils, said receiver coil second coil section being located within the magnetic field produced about said transmitter coil second coil section by said current, whereby the voltage in said receiver coil second coil section induced therein by the magnetic field of said transmitter coil second coil section is substantially unaffected by said presence of said metal object.

2. The metal detector of claim 1 wherein said second coil sections of the transmitter and receiver coils are parallel and fixedly spaced above the plane of location of said first coil sections of said transmitter and receiver coils.

3. The metal detector of claim 2 wherein said second coil sections of the transmitter and receiver coils are positioned over at least one of said first coil sections of the transmitter and receiver coils.

4. The metal detector of claim 1 wherein the first and second coil sections of each transmitter and receiver coil are formed of continuous windings.

5. The metal detector of claim 4 wherein each transmitter and receiver coil is of a multiple looped wire winding.

* * * * *